(12) United States Patent
Reiker

(10) Patent No.: US 6,423,899 B1
(45) Date of Patent: Jul. 23, 2002

(54) SIDE MOUNT JUNCTION BOX

(75) Inventor: Kenneth H. Reiker, Shalimar, FL (US)

(73) Assignee: Reiker Enterprises of Northwest Florida, Inc., Solvay, NY (US)

( * ) Notice: Subject to any disclaimer, the term of this patent is extended or adjusted under 35 U.S.C. 154(b) by 0 days.

(21) Appl. No.: 09/615,043

(22) Filed: Jul. 12, 2000

Related U.S. Application Data

(63) Continuation-in-part of application No. 09/372,100, filed on Aug. 11, 1999, now Pat. No. 6,303,862, and a continuation-in-part of application No. 09/321,741, filed on May 28, 1999, now Pat. No. 6,242,696, and a continuation-in-part of application No. 08/905,142, filed on Aug. 1, 1997, now Pat. No. 5,981,874, and a continuation-in-part of application No. 08/862,378, filed on May 23, 1997, now Pat. No. 5,909,006, and a continuation-in-part of application No. 08/862,379, filed on May 23, 1997, now Pat. No. 5,965,845, and a continuation-in-part of application No. 08/490,750, filed on Jun. 15, 1995, now Pat. No. 5,677,512, and a continuation-in-part of application No. 08/371,695, filed on Jan. 12, 1995, now Pat. No. 5,854,443.

(60) Provisional application No. 60/142,957, filed on Jul. 12, 1999, provisional application No. 60/023,060, filed on Aug. 2, 1996, and provisional application No. 60/018,227, filed on May 24, 1996.

(51) Int. Cl.$^7$ ............................................... H01H 9/02
(52) U.S. Cl. ............................ 174/58; 174/63; 220/3.3; 220/3.9; 248/906
(58) Field of Search ........................... 174/58, 48, 62, 174/64, 53, 63; 220/3.2, 3.3, 3.8, 3.9; 248/906, 205.3; 52/220.8

(56) References Cited

U.S. PATENT DOCUMENTS

| | | |
|---|---|---|
| 950,176 A | 2/1910 | Hublinger |
| 1,066,706 A | 7/1913 | Caine |
| 1,824,708 A | 9/1931 | Davis et al. |
| 2,374,993 A | 5/1945 | Haynes |
| 2,423,757 A | 7/1947 | Dedge |
| 2,917,263 A | 12/1959 | Appleton et al. |
| 3,616,096 A | 10/1971 | Roeder |
| 3,770,872 A | 11/1973 | Brown |
| 4,062,470 A | 12/1977 | Boteler |

(List continued on next page.)

FOREIGN PATENT DOCUMENTS

| | | |
|---|---|---|
| FR | 2436518 | 5/1980 |
| GB | 1309950 | 3/1973 |
| WO | WO01/01033 | 1/2001 |

*Primary Examiner*—Dean A. Reichard
*Assistant Examiner*—Dhiru R. Patel
(74) *Attorney, Agent, or Firm*—Shlesinger, Arkwright & Garvey LLP

(57) ABSTRACT

Mounting assembly includes a junction box having a top wall and a downwardly extending side wall that define a cavity therein. A side mount may be disposed adjacent the junction box. A fixture support may be provided; and the side mount, the junction box, and the fixture support are disposed so that substantially all forces exerted on the fixture support are transferred to the side mount. The side mount may be attached to the junction box and may include a mounting plate configured for being secured to a support surface. The mounting plate may extend away from the junction box and may extend over the top wall of the junction box. A fastener may be provided which secures the side mount to the junction box. A fastener may be provided for securing the side mount to the support surface. The junction box may be made of plastic and the side mount may be made of metal. The junction box may be made of light weight material, such as plastic, given that the load exerted by a fixture is transferred substantially directly to the side mount and/or to the support surface to which the side mount is attached.

31 Claims, 4 Drawing Sheets

U.S. PATENT DOCUMENTS

| | | |
|---|---|---|
| 4,140,293 A | 2/1979 | Hansen |
| 4,275,862 A | 6/1981 | Takagi et al. |
| 4,281,773 A | 8/1981 | Mengeu |
| 4,403,708 A | 9/1983 | Smolik |
| 4,483,453 A | 11/1984 | Smolik |
| 4,572,391 A | 2/1986 | Medlin |
| 4,747,506 A | 5/1988 | Stuchlk, III |
| 4,787,587 A | 11/1988 | Deming |
| 4,788,383 A | 11/1988 | Caison |
| 4,880,128 A | 11/1989 | Jorgensen |
| RE33,147 E | 1/1990 | Reiker |
| 4,909,405 A | 3/1990 | Kerr, Jr. |
| 4,954,667 A | 9/1990 | Jorgensen et al. |
| 4,988,067 A | 1/1991 | Propp et al. |
| 5,150,868 A | 9/1992 | Kaden |
| 5,170,014 A | 12/1992 | Borsh |
| 5,239,132 A | 8/1993 | Bartow |
| 5,257,487 A | 11/1993 | Bantz et al. |
| 5,303,894 A | 4/1994 | Deschamps et al. |
| RE34,603 E | 5/1994 | Caison et al. |
| 5,359,152 A * | 10/1994 | Hone-Lin .................... 174/53 |
| 5,435,514 A | 7/1995 | Kerr, Jr. |
| 5,606,147 A | 2/1997 | Deschamps et al. |
| 5,661,264 A | 8/1997 | Reiker |
| 5,677,512 A | 10/1997 | Reiker |
| 5,710,392 A | 1/1998 | Bordwell et al. |
| 5,762,223 A | 6/1998 | Kerr, Jr. |
| 5,854,443 A | 12/1998 | Reiker |
| 5,860,548 A | 1/1999 | Kerr, Jr. |
| 5,883,331 A | 3/1999 | Reiker |
| 5,907,124 A | 5/1999 | Reiker |
| 5,909,006 A | 6/1999 | Reiker |
| 5,938,157 A | 8/1999 | Reiker |
| 5,965,845 A | 10/1999 | Reiker |
| 5,981,874 A | 11/1999 | Reiker |
| 5,989,708 A | 11/1999 | Kreckel |
| 6,001,471 A | 12/1999 | Bries et al. |
| 6,004,642 A | 12/1999 | Langford |
| 6,096,974 A | 8/2000 | Reiker |
| 6,207,894 B1 | 3/2001 | Reiker |
| 6,207,898 B1 | 3/2001 | Reiker |
| 6,242,696 B1 | 6/2001 | Reiker |

* cited by examiner

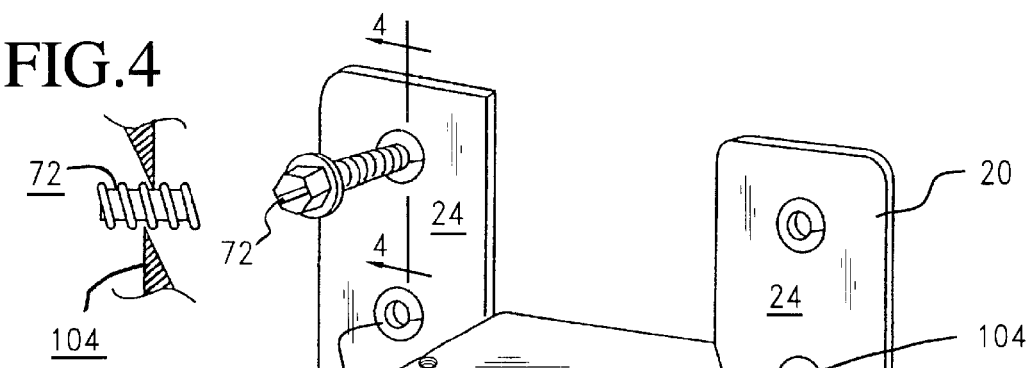
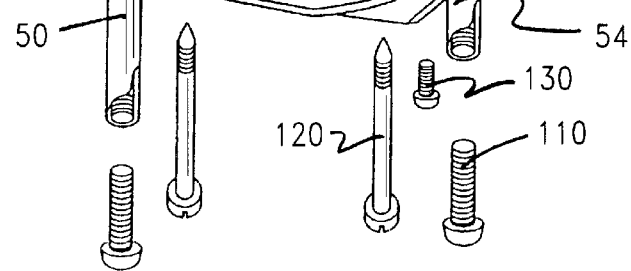
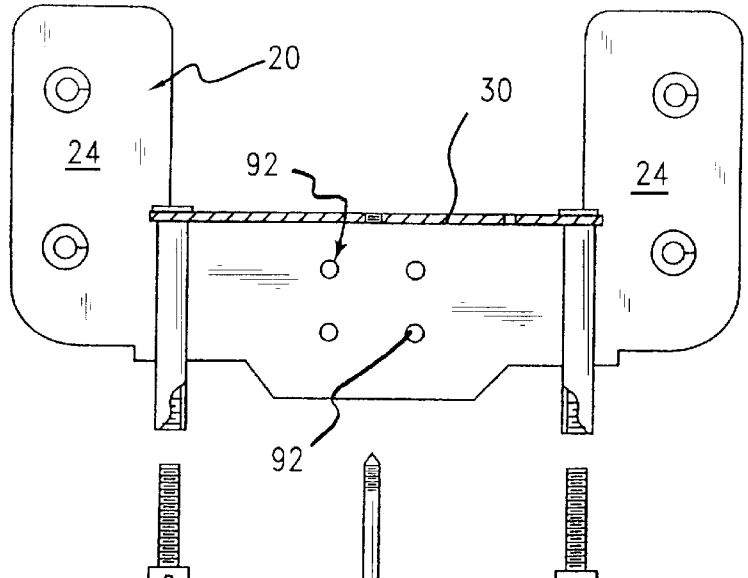
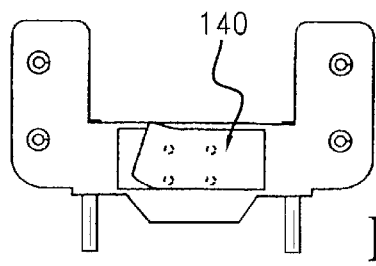
FIG.4
FIG.3
FIG.5
FIG.6

SIDE MOUNT JUNCTION BOX

CROSS REFERENCE TO RELATED APPLICATIONS

This application claims the priority of application Ser. No. 60/142,957, filed Jul. 12, 1999, which is incorporated herein by reference.

This application claims the priority of provisional application No. 60/023,060, filed Aug. 2, 1996 and this application claims the priority of provisional application No. 60/018,227, filed May 24, 1996.

This application is a continuation-in-part of application Ser. No. 09/372,100, filed Aug. 11, 1999, now U.S. Pat. No. 6,303,862, issued Oct. 16, 2001, and this application is a continuation-in-part of application Ser. No. 09/321,741, filed May 28, 1999, now U.S. Pat. No. 6,242,696, issued Jun. 5, 2001, and this application is a continuation-in-part of application Ser. No. 08/905,142, filed Aug. 1, 1997, now U.S. Pat. No. 5,981,874, issued Nov. 9, 1999, and this application is a continuation-in-part of application Ser. No. 08/862,378, filed May 23, 1997, now U.S. Pat. No. 5,909,006, issued Jun. 1, 1999, and this application is a continuation-in-part of application Ser. No. 08/862,379, filed May 23, 1997, now U.S. Pat. No. 5,965,845, issued Oct. 12, 1999, and this application is a continuation-in-part of application Ser. No. 08/490,757, filed Jun. 15, 1995, now U.S. Pat. No. 5,677,512, issued Oct. 14, 1997, and this application is a continuation-in-part of application Ser. No. 08/371,695, filed Jan. 12, 1995, now U.S. Pat. No. 5,854,443, issued Dec. 29, 1998.

This application relates to various co-pending applications and issued patents in the name of Kenneth H. Reiker.

FIELD OF THE INVENTION

The invention relates to junction boxes having attachment elements. More particularly, the invention relates to junction boxes having attachment elements attached to at least one of the sides of the junction box.

Even more particularly, the invention relates to junction boxes suited for being attached by an attachment element on one of the sides of the junction box to a support surface, and which attachment element includes an integrally attached strengthening element for enhancing the connection between the attachment element and the remainder of the junction box.

BACKGROUND OF THE INVENTION

Side mount junction boxes are known.

Known side mount junction boxes have drawbacks such as the side mounting attachments becoming readily detached from the junction box, so that known junction boxes are separated from the supports to which the side mount are attached. Quite simply, with known side mount junction boxes, the junction boxes are easily broken off from the side mount elements. Such breaking off may occur when a force is applied to the junction box and the fasteners which secure the side mount to the junction box are sheared off, for example.

For these and other reasons, known side mount junction boxes have only been approved by Underwriter's Laboratory (UL) for light duty applications. Light duty applications include known junction boxes being used to support fixtures subjected to static loads less than 35 pounds of force.

It can be seen that there is a need for a side mount junction box or mounting assembly that overcomes these and other drawbacks of known devices.

OBJECTS AND SUMMARY OF THE INVENTION

It is an object of the invention to provide a mounting assembly which overcomes the drawbacks of known devices.

Another object of the invention is to provide a mounting assembly which is easier to use than known devices.

A further object of the invention is to provide a side mount junction box which is stronger than known devices.

A still further object of the invention is to provide a side mount junction box which can be used for heavy duty application (i.e., for use as a support for fixtures weighing more than 35 pounds), and/or use with dynamic loads, such as ceiling fans.

Yet another object of the invention is to provide a side mount junction box which is easy and economical to manufacture, easy and economical to use, and which has some or all of the benefits set forth herein.

It will be appreciated that a relative terms such as up, down, left, and right, heavy, and light are for convenience in describing the invention and are not intended to be limiting.

BRIEF DESCRIPTION OF THE DRAWINGS

FIGS. 1–5 show a first preferred embodiment of a side mount junction box mounting assembly according to the invention;

FIG. 6 is a rear view of a further embodiment of a side mount according to the invention;

DETAILED DESCRIPTION OF THE INVENTION

FIGS. 1–5 illustrate a first preferred embodiment of a side mount junction box mounting assembly 6 according to the invention.

Figure 1:
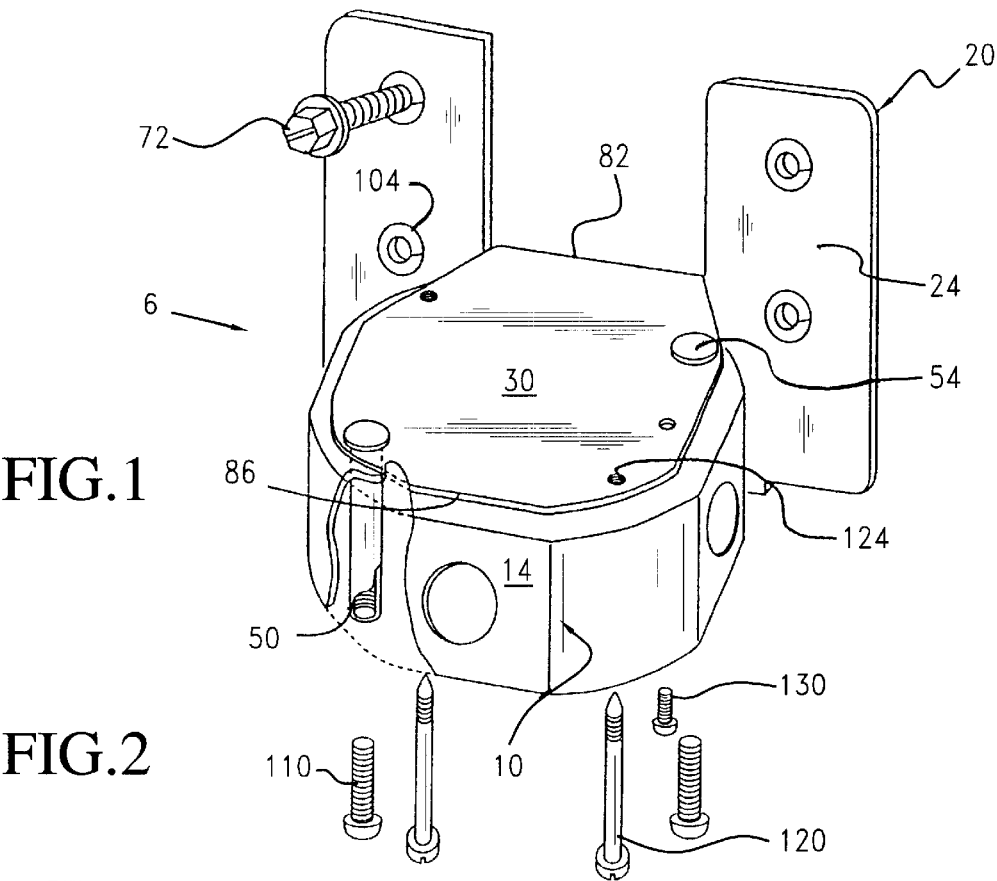

FIG. 1 is a top perspective view illustrating a junction box 10 having a side wall 14 and a top wall 18 that is supported on the face F of a support surface S by use of a side mount 20 which includes a mounting plate 24 extending away from the junction box 10 and a support plate 30 which extends over at least a portion of one of the faces of the junction box. As illustrated, the mounting plate 30 extends away from the junction box 10 and the support plate 24 extends over the top wall 18 of the junction box.

It is expected that fixture supports 50 and 54 be located for engaging the support plate 30 in such a manner that substantially all the force which is exerted on the support plate 30 by a fixture mounted to the junction-box 10 (i.e., to the fixture supports 50,54) will be transferred to the support plate 30 and the side mount 20, and then to the support surface (e.g., a stud).

Figure 2:
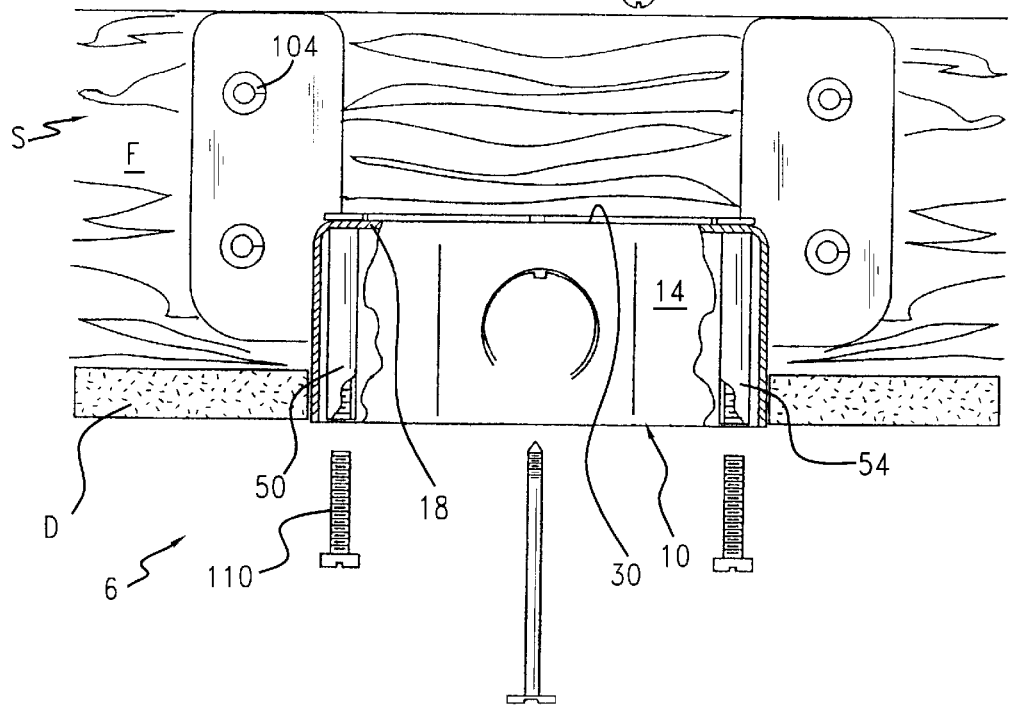

Thus, even if the weight of a fixture supported by the fixture support 50 located at the front left of the side mount junction box 10 shown in FIGS. 1 and 2 has a tendency to rotate a front edge of the support plate 30 downwardly away from the top left mounting screw 72 illustrated in FIG. 1, then any forces not transferred from the rear 82 of the support plate 30 to the mounting plate 24 will be directed against the face F of the support surface S to which the side mount junction box 10 is attached. Use of drywall D is shown in FIG. 2.

There may likewise be some tendency for such forces to act on the rear 82 of the support plate 30 tending to pull the rear 82 of the support plate in a direction toward the front edge 86 of the support plate 30.

However, it is contemplated that those forces will be transferred to and carried by the mounting plates 24. Thanks to the configuration of the invention, there will be few, if any, forces which will be directed to detaching the junction box 10 from the side mount 20.

Please see FIG. 5 which illustrates holes 92 for rivets through which rivets will be inserted for riveting the junction box to the mounting plate 24, for example. Other fasteners and fastening means are contemplated instead of or in addition to rivets.

FIG. 3 illustrates the side mount 20 with the junction box 10 removed for clarity.

FIG. 4 is a sectional view of the mounting screw 72 and self-holding or self-supporting fastener 104 on an enlarged scale taken along line 4—4 of FIG. 3.

That self-supporting fastener 104 is useful for mounting of the junction box 10 with "hand-free" operation, as well as for shipment of the device with fasteners in place.

FIG. 5 is a front view of the side mount 20 of FIG. 4 with the junction box 10 removed.

A fixture support fastener 110 mates with fixture support 50. A further fixture support 120 mates with a further hole 124.

A ground screw 130 is shown in FIGS. 1 and 3.

FIG. 6 is a rear view of a further embodiment of the side mount illustrating the use of an adhesive such as tape or double-sided tape 140 for securing the side mount junction box to a support surface at least temporarily, so that the user may permanently secure the side mount by the use of the illustrated mounting screws, for example.

The use of such double-sided tape is described in detail in U.S. Pat. No. 5,677,512 to Reiker, column 3, lines 27–38 and column 6, lines 51–57 of which are incorporated herein by reference, suggesting alternative adhesives such as a patch of glue, putty, or a spray-on adhesive be used in addition to, or instead of adhesive tape. Such alternative adhesives are contemplated for use in the present invention.

Figure 7:
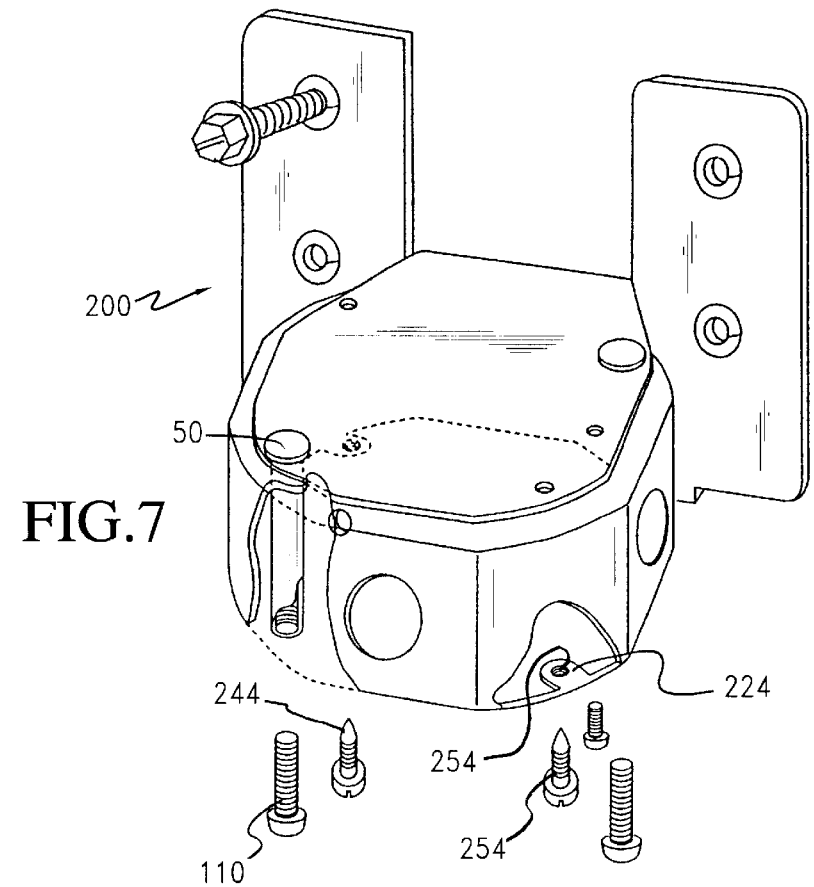
FIGS. 7 and 8 show a further preferred embodiment of a mounting assembly according to the invention.
Figure 8:
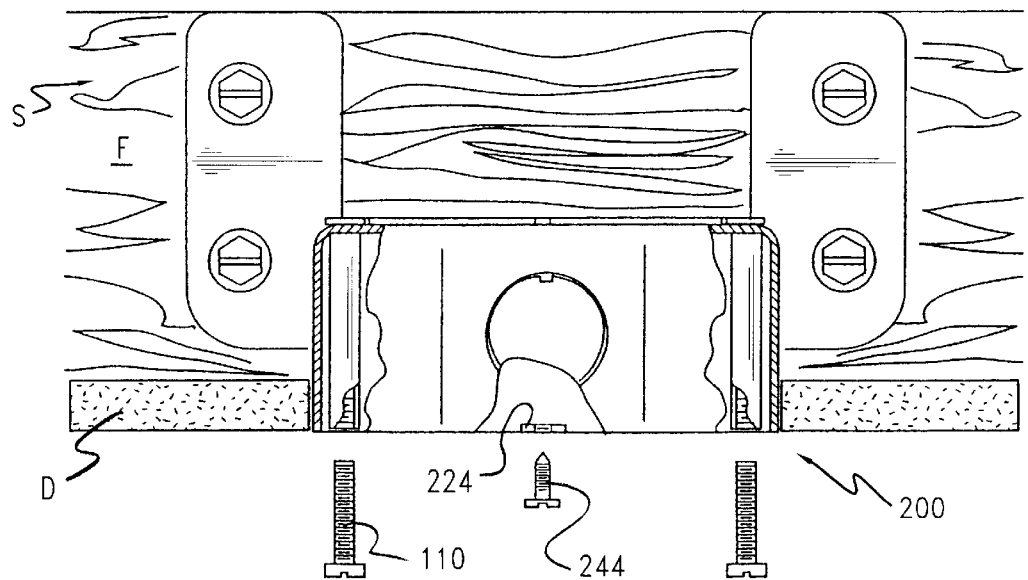

FIGS. 7 and 8 illustrate another preferred embodiment of a side mount junction box mounting assembly according to the invention.

In this embodiment, as well as in the other embodiments, it is contemplated that two(2) different types of fixture supports be used in the FIG. 7 embodiment. Those two(2) types include a stud or fixture support 50 supported directly by the support plate 30, as in the earlier embodiments, and a bent ear 224, such as a bent piece of metal from a metal junction box may be provided for supporting a different size of fastener 244, such as may be used with a light weight fixture.

As will be appreciated, a threaded hole 254 may be provided on the bent ear 224 for receiving the illustrated further fixture support.

Figure 9:
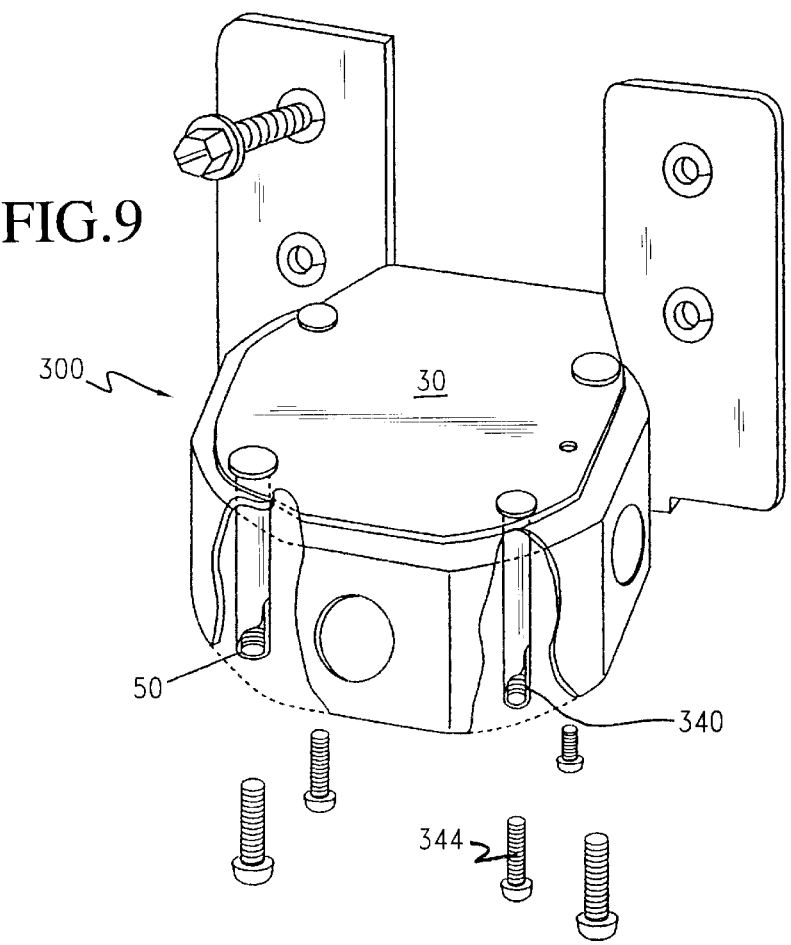
FIGS. 9 and 10 show another preferred embodiment of a mounting assembly according to the invention.
Figure 10:
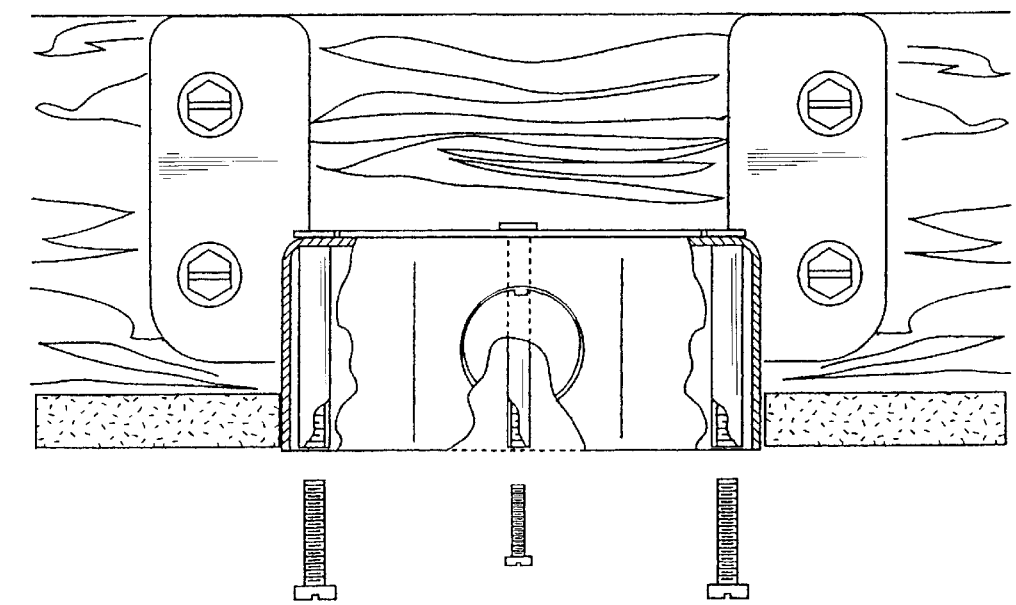

FIGS. 9 and 10 illustrate yet another preferred embodiment of a mounting assembly 300 according to the invention, in which both the fixture support 50 and the further fixture support 340 are studs which are supported directly by the support plate 30.

Typically, the further fixture support 340 will be sized for receiving a fixture fastener 344 of a different size than the fixture support 50 so that the FIGS. 9 and 10 embodiment, as in the other embodiments, may be used, alternatively, for supporting two different types of fixtures.

It will thus be appreciated that any or all of the illustrated junction boxes could be made of light weight material, such as plastic, given that the load exerted by a fixture is transferred substantially directly to the side mount and/or to the support surface to which the side mount is attached. In other words, it may be appreciated that the side mount, the junction box, and the fixture support are disposed so that substantially all forces exerted on the fixture support are transferred to the side mount.

In this manner, the side mount junction box according to the invention can be used for supporting high static and dynamic loads, such as heavy duty chandeliers and ceiling fans, and should be acceptable to the Underwriter's Laboratory (UL) for supporting ceiling fans weighing more than 35 pounds.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A mounting assembly, comprising:
    a) a plastic junction box having a top wall and a downwardly extending side wall defining a cavity therein;
    b) a metal side mount attached to the junction box;
    c) a fixture support being provided;
    d) the side mount, the junction box, and the fixture support being disposed so that substantially all forces exerted on the fixture support are transferred to the side mount;
    e) the side mount including a mounting plate configured for being secured to a support surface;
    f) the mounting plate extending away from the junction box; and
    g) the side mount including a support plate extending over one of the top wall and the side wall of the junction box.
2. An assembly as in claim 1, wherein:
    a) at least one fastener secures the side mount to the junction box.
3. An assembly as in claim 2, wherein:
    a) the at least one fastener includes a rivet.
4. An assembly as in claim 2, wherein:
    a) the at least one fastener includes a screw.
5. An assembly as in claim 1, wherein:
    a) the support plate extends over the top wall.
6. An assembly as in claim 5, wherein:
    a) the fixture support is disposed for transferring substantially all forces exerted by a fixture supported on the fixture support substantially directly to the support plate.
7. An assembly as in claim 1, wherein:
    a) the fixture support extends into the junction box cavity.
8. An assembly as in claim 1, wherein:
    a) an adhesive is provided on said side mount for adhering the side mount to a support surface.
9. An assembly as in claim 8, wherein:
    a) the adhesive includes a tape.

10. An assembly as in claim 9, wherein:
a) the tape includes double-sided tape.
11. An assembly as in claim 1, wherein:
a) a further fixture support is provided; and
b) the further fixture support is sized for securing a fastener different from the fixture support.
12. An assembly as in claim 11, wherein:
a) the fixture support includes a pair of fixture supports; and
b) the further fixture support includes a pair of further fixture supports.
13. An assembly as in claim 1, wherein:
a) a self-supporting fastener is provided on said side mount.
14. An assembly as in claim 1, wherein:
a) said fixture support includes a stud which engages the support plate; and
b) the stud is disposed so that forces exerted on the stud by a fixture supported thereby are transferred substantially directly to the support plate without exerting forces on the junction box when a fixture is supported thereby.
15. A mounting assembly, comprising:
a) a plastic junction box having a top wall and a downwardly extending side wall defining a cavity therein;
b) a metal side mount attached to the junction box;
c) a fixture support being provided;
d) the side mount, the junction box, and the fixture support being disposed so that substantially all forces exerted on the fixture support are transferred to the side mount;
e) the side mount including a support plate extending over one of the top wall and the side wall of the junction box.
16. An assembly as in claim 15, wherein:
a) the support plate extends over the top wall.
17. An assembly as in claim 16, wherein:
a) the fixture support is disposed for transferring substantially all forces exerted by a fixture supported on the fixture support substantially directly to the support plate.
18. An assembly as in claim 15, wherein:
a) an adhesive is provided on said side mount for adhering the side mount to a support surface.
19. An assembly as in claim 18, wherein:
a) the adhesive includes a tape.
20. An adhesive as in claim 19, wherein:
a) the tape includes double-sided tape.
21. An assembly as in claim 15, wherein:
a) a further fixture support is provided; and
b) the further fixture support is sized for securing a fastener different from the fixture support.
22. An assembly as in claim 21, wherein:
a) the fixture support includes a pair of fixture supports; and
b) the further fixture support includes a pair of further fixture supports.
23. An assembly as in claim 15, wherein:
a) a self-supporting fastener is provided on said side mount.
24. An assembly as in claim 15, wherein:
a) the side mount includes a mounting plate configured for being secured to a support surface.
25. An assembly as in claim 24, wherein:
a) the mounting plate extends away from the junction box.
26. A mounting assembly, comprising:
a) a junction box having a top wall and a downwardly extending side wall defining a cavity therein;
b) a side mount disposed adjacent the junction box;
c) a fixture support being provided; and
d) the side mount, the junction box, and fixture support being disposed so that substantially all forces exerted on the fixture support are transferred to the side mount; and
e) the side mount including a support plate extending over one of the top wall and the side wall of the junction box.
27. An assembly as in claim 26, wherein:
a) a further fixture support is provided; and
b) the further fixture support is sized for securing a fastener different from the fixture support.
28. An assembly as in claim 26, wherein:
a) an adhesive is provided on said side mount for adhering the side mount to a support surface.
29. An assembly as in claim 28, wherein:
a) the tape includes double-sided tape.
30. An assembly as in claim 26, wherein
a) the side mount includes a mounting plate configured for being secured to a support surface.
31. An assembly as in claim 26, wherein:
a) the mounting plate extends away from the junction box.

\* \* \* \* \*